(12) United States Patent
Das (10) Patent No.: US 11,222,631 B2
(45) Date of Patent: Jan. 11, 2022

(54) PERFORMANCE EVALUATION USING AUDIO AND STRUCTURED FEEDBACK

(71) Applicant: International Business Machines Corporation, Armonk, NY (US)

(72) Inventor: Rajarshi Das, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 16/216,183

(22) Filed: Dec. 11, 2018

(65) Prior Publication Data

US 2020/0184951 A1    Jun. 11, 2020

(51) Int. Cl.
| | | |
|---|---|---|
| *G10L 15/22* | (2006.01) | |
| *G10L 13/10* | (2013.01) | |
| *G10L 15/18* | (2013.01) | |
| *G10L 25/78* | (2013.01) | |
| *G06F 40/40* | (2020.01) | |
| *G06F 40/205* | (2020.01) | |
| *G10L 25/63* | (2013.01) | |

(52) U.S. Cl.
CPC ............ *G10L 15/22* (2013.01); *G06F 40/205* (2020.01); *G06F 40/40* (2020.01); *G10L 13/10* (2013.01); *G10L 15/1822* (2013.01); *G10L 25/63* (2013.01); *G10L 25/78* (2013.01)

(58) Field of Classification Search
CPC ....... G10L 25/63; G10L 15/26; G10L 15/265; G06Q 10/105

See application file for complete search history.

(56) References Cited

U.S. PATENT DOCUMENTS

| | | | |
|---|---|---|---|
| 4,375,080 A | 2/1983 | Barry et al. | |
| 8,489,438 B1 * | 7/2013 | Ibrahim | G06Q 30/02 701/468 |
| 8,554,597 B2 * | 10/2013 | Allpress | G06Q 10/063112 705/7.12 |
| 8,768,752 B1 * | 7/2014 | Buckelew | G06Q 10/06398 705/7.42 |
| 9,336,268 B1 | 5/2016 | Moudy et al. | |
| 9,349,299 B1 | 5/2016 | Thom | |
| 9,558,733 B1 | 1/2017 | Korn | |
| 9,596,349 B1 * | 3/2017 | Hernandez | H04M 3/5175 |
| 9,818,406 B1 * | 11/2017 | Chan | G10L 15/22 |
| 10,009,465 B1 * | 6/2018 | Fang | H04M 3/5166 |
| 10,019,988 B1 * | 7/2018 | Chan | G06F 16/683 |
| 10,482,511 B1 * | 11/2019 | Artman | G06Q 30/0601 |
| 2002/0019765 A1 * | 2/2002 | Mann | G06Q 10/063112 705/7.14 |
| 2002/0099539 A1 * | 7/2002 | Nishizawa | G10L 17/26 704/207 |

(Continued)

*Primary Examiner* — Shaun Roberts
(74) *Attorney, Agent, or Firm* — Patterson + Sheridan, LLP (57) ABSTRACT

Techniques for providing an evaluation for an evaluation subject are described. The techniques include verifying the accuracy of evaluations based on an audio or recorded evaluation. The evaluations are verified by identifying a set of evaluators to provide an evaluation of an evaluation subject and requesting the evaluation from one of the identified set of evaluators. The evaluators then provide to a system described herein a structured evaluation input and an audio evaluation input from the solicited evaluator. The audio evaluation input is processed for evaluation indicators and the structured evaluation input is verified based on the evaluation indicators.

20 Claims, 5 Drawing Sheets

(56) References Cited

U.S. PATENT DOCUMENTS

| | | | |
|---|---|---|---|
| 2004/0172323 A1* | 9/2004 | Stamm | G06Q 30/02 |
| | | | 705/7.32 |
| 2010/0062411 A1 | 3/2010 | Bartholomew | |
| 2013/0111363 A1* | 5/2013 | Linton | G06F 3/048 |
| | | | 715/753 |
| 2013/0173269 A1* | 7/2013 | Adler | G06F 40/289 |
| | | | 704/251 |
| 2014/0134590 A1* | 5/2014 | Hiscock Jr. | G09B 5/00 |
| | | | 434/350 |
| 2014/0259189 A1* | 9/2014 | Ramachandran | H04W 4/21 |
| | | | 726/30 |
| 2015/0317641 A1 | 11/2015 | Khor et al. | |
| 2016/0163332 A1* | 6/2016 | Un | G10L 25/63 |
| | | | 704/260 |
| 2016/0236690 A1 | 8/2016 | Juneja et al. | |
| 2017/0004517 A1* | 1/2017 | Jaggi | G06Q 50/01 |
| 2017/0068976 A1* | 3/2017 | Wawrzynowicz | |
| | | | G06Q 30/0203 |
| 2017/0069226 A1 | 3/2017 | Spinelli et al. | |
| 2017/0154293 A1* | 6/2017 | Baduge | G10L 25/87 |
| 2017/0300990 A1* | 10/2017 | Tanaka | G10L 17/005 |

\* cited by examiner

PERFORMANCE EVALUATION USING AUDIO AND STRUCTURED FEEDBACK

BACKGROUND

The present disclosure relates to providing feedback and performance evaluation to subjects under evaluation, and more specifically, to using recorded audio feedback from evaluators in to determine and verify evaluation scores for the subject under evaluation.

Many employers and other organizations rely on routine performance evaluations of people in order to both determine an individual's performance in relation to completing certain milestones and to provide feedback on how to help the individual improve or highlight the successes of the individual. For example, educators rely on performance evaluations for teachers and principals to both identify how well the teachers are instructing various subjects as well as how to improve their teaching methods and approaches.

Current techniques for most performance evaluations, including teacher evaluations, rely on textual/structured input from evaluators such as students in the teachers' classes, parents, teacher peers, supervisors (principals, headmasters, etc.), as well as scored learning outcomes such as the results of students from tests for classes completed. However, the text based and/or structured feedback as in the current methods often do not provide a full representation of the feedback from the various evaluators. For example, if a structured input has three options for feedback, two evaluators may select the same input of the three options, even if the actual evaluations of the two evaluators vary. The limited nature of textual/structured input in evaluations does not provide for discrete and granular evaluations of individuals based on the most representative opinion of the evaluator.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for evaluation including: identifying a set of evaluators to provide an evaluation of an evaluation subject, requesting the evaluation from one of the identified set of evaluators, receiving a structured evaluation input and an audio evaluation input from the solicited evaluator, parsing the audio evaluation input for evaluation indicators, and verifying the structured evaluation input based on the evaluation indicators. Other embodiments of this aspect include corresponding computer systems, apparatus, and computer programs recorded on one or more computer storage devices, each configured to perform the actions of the methods.

According to one embodiment, a system for evaluation including: one or more computer processors, and a memory containing a program which when executed by the processors performs an operation is provided. The operation including: identifying a set of evaluators to provide an evaluation of an evaluation subject; requesting the evaluation from one of the identified set of evaluators, receiving a structured evaluation input and an audio evaluation input from the solicited evaluator, parsing the audio evaluation input for evaluation indicators, and verifying the structured evaluation input based on the evaluation indicators.

According to one embodiment, a computer program product for evaluation is provided. The computer program product including: a computer-readable storage medium having computer-readable program code embodied therewith, the computer-readable program code executable by one or more computer processors to perform an operation. The operation including: identifying a set of evaluators to provide an evaluation of an evaluation subject; requesting the evaluation from one of the identified set of evaluators; receiving a structured evaluation input and an audio evaluation input from the solicited evaluator; parsing the audio evaluation input for evaluation indicators; and verifying the structured evaluation input based on the evaluation indicators.

DETAILED DESCRIPTION

As described above, performance evaluations based on structured or textual inputs alone do not provide a discrete and granular level evaluation of an evaluation subject. As described herein, a voice based feedback mechanism is used to provide additional detail to the text based/structured feedback. The proposed systems and methods outline the steps for determining a performance evaluation by combining audio feedback and structured feedback from multiple evaluators.

In many cases, the tone of a person's voice can provide valuable information on their opinion about the information about which they are speaking. In many cases, the words spoken can be interpreted in various ways that cannot be understood from the words alone. For example, an evaluator's spoken words may indicate a neutral position, while the tone indicates a positive position. For example, in response to a question, "How was your service today?" An evaluator may state the words "It was good." While the words themselves indicate some level of satisfaction with the service, the evaluator's tone can provide a much deeper understanding of the evaluator's opinion. According to the embodiments described herein, combining an interpretation of an evaluators tone with the combination of many other types of structured and audio feedback/evaluations creates a more accurate evaluation than a structured evaluation alone.

For example, embodiments described herein provide a method to modify a give evaluation. For example, a rating such as '3' can be modified to a '2' or a '4' based on an analysis of audio evaluation factors such as tone. Additionally, the methods and systems described herein provide for collecting verbal feedback from multiple stakeholders/evaluators, to generate a refined verified evaluation. In some examples, the verified evaluations can be updated and refined over a period of time, such as every semester or year for a teacher. This provides for continuous evaluation and improvement of the evaluation subject Embodiments described herein also include saving evaluation indicators corresponding to specific evaluators for later use. For example, the systems described herein create a tone map along with tone count-per-tone-type for every evaluator based on audio evaluations provided to the system. The evaluation indicators may also be saved as a as a tone history for use in subsequent evaluation verifications. For example, the tone history along with a current tone evaluation are used to generate a consolidated tone rating for the evaluator and used to verify/adjust the evaluator's rating of an evaluation subject based on past evaluations.

Additional embodiments include a weighted evaluation of an evaluation subject such as a teacher, where the weighted evaluation is configurable based on factors, such as the specific subject or level of service (e.g., school grade) corresponding to the specific evaluation. For example, the system may gather feedback per graded standard or per subject for every student.

Figure 1:
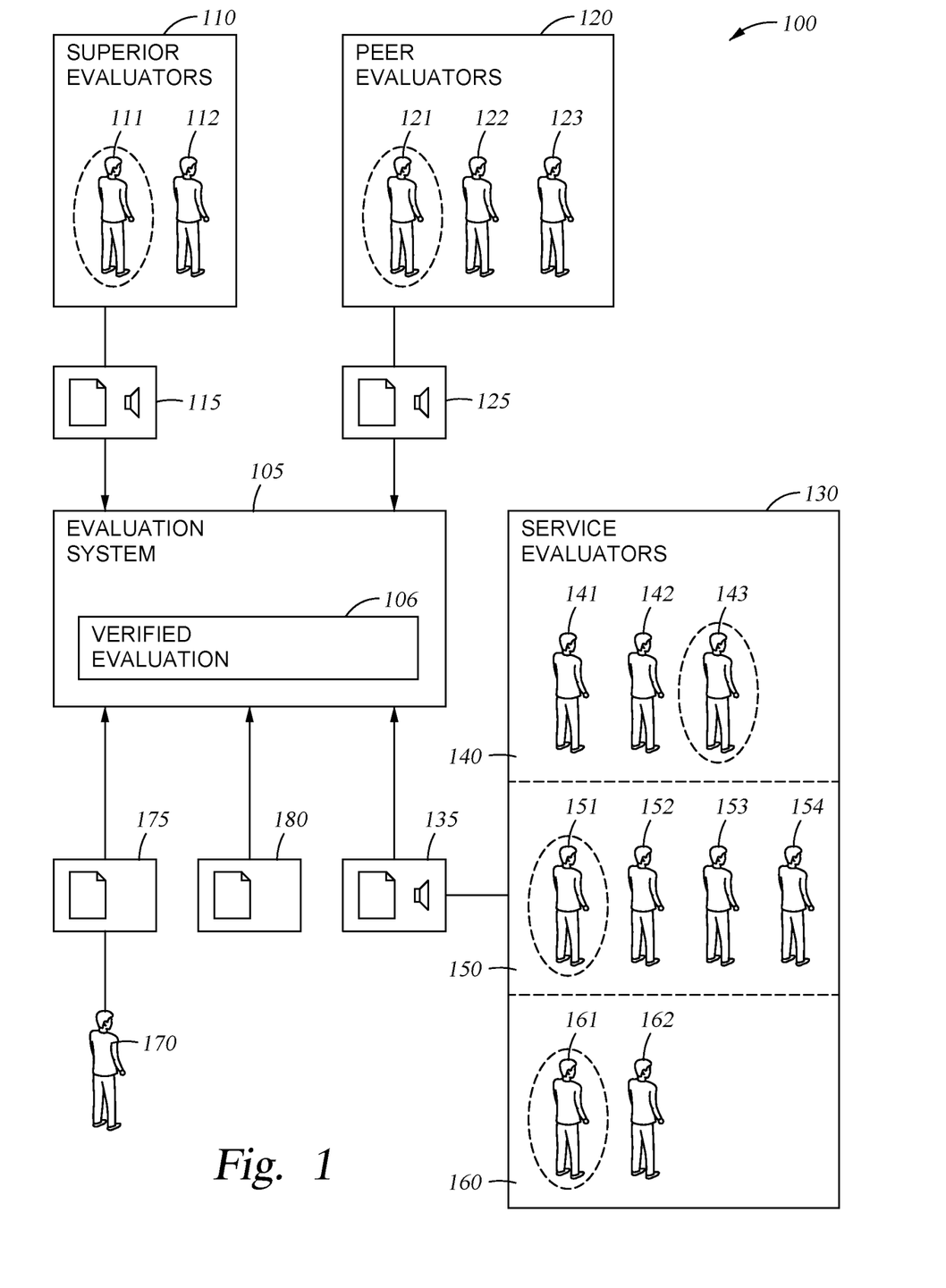
FIG. 1 illustrates a system of evaluators for an evaluation, according to one embodiment described herein.

FIG. 1 illustrates a system of evaluators for an evaluation, according to one embodiment. As shown FIG. 1, the system 100 includes a variety of evaluators and an evaluation system 105. The evaluation system 105 receives evaluations in a variety of forms and produces the verified evaluation 106, as described herein. While described herein in relation to evaluation subjects, such as teachers and/or educators, any type of profession/worker/service provider which provides a service to other people can also be evaluated using this system and methods described herein.

For a given evaluation subject there are a variety of stakeholders which can provide an evaluation of the evaluation subject. For example, for a teacher who is being evaluated, the various stakeholders and evaluators include a set of superior evaluators 110 (principals/headmasters/administrators), a set of peer evaluators 120 (other teachers/administrators), and a set of service evaluators 130 (students/student's parents). Other inputs to the system 105 may also include an analytical performance evaluation 180 and a self-evaluation 175 from the evaluation subject 170.

In some examples, an evaluation is not required from every possible evaluator in the system 100 to provide an adequate evaluation of the evaluation subject. In some examples, the system 105 will identify a set of evaluators to provide an evaluation of the evaluation subject from the entire set of possible evaluators. For example, for the superior evaluators 111 and 112, the system 105 may identify and select the superior evaluator 111 to provide an evaluation 115 to the system 105. The system 105 may use a number of criteria and/or parameters to identify/select from the set of superior evaluators, including observation time of the evaluation subject, level of superiority, other interactions with the evaluation subject, etc. In some examples, the identification/selection of the superior evaluator(s) may be randomized. In another example, the identification/selection of the superior evaluator(s) may be standardized such that the superior evaluators are predetermined and/or standard for each evaluation subject. For example, a superior evaluator for a teacher evaluation subject may be identified/selected as a principal that has observed the teacher in the classroom or other teaching setting, may be randomly identified/selected from a set of principals at a school, or may be a principal assigned to evaluate all teachers and/or assigned to evaluate the evaluation subject in a given example.

Additionally, in some examples, the system 105 also selects/identifies evaluator(s) from the set of peer evaluators 120. For example, as shown in FIG. 1, the system 105 selects peer evaluator 121 from among the peer evaluators 121-123 to provide an evaluation of the evaluation subject. The system 105 may use a number of criteria and/or parameters to identify/select from the set of peer evaluators, including observation time of the evaluation subject, other interactions with the evaluation subject, etc. In some examples, the identification/selection of the peer evaluator(s) may be randomized. In another example, the identification/selection of the peer evaluator(s) may be standardized such that the peer evaluator(s) are predetermined and/or standard for each evaluation subject. For example, a peer evaluator for a teacher evaluation subject may be identified/selected as a peer teacher that has observed the evaluation subject teacher in the classroom or other teaching setting, may be randomly identified/selected from a set of teachers at a school, or may be a teacher/administrator assigned to evaluate all teachers and/or assigned to evaluate the evaluation subject in a given example.

In another example, the system also selects/identifies evaluator(s) from the set of service evaluators 130. The service evaluators are generally those who have received service from the evaluation subject. When the evaluation subject is a teacher, the service evaluators include students and/or student's parents. In some examples, the service evaluators are tiered. For example, as shown in FIG. 1, the service evaluators include a first tier 140, a second tier 150, and a third tier 160. In some examples, the various tiers reflect a selection of service evaluators according to a grading metric. For example, in an education setting the service evaluator (students) may be sorted into performance tiers based on grades and/or educational level. For example, the first tier 140 includes top performing students, the second tier 150 includes average performing students, and the third tier 160 includes lower performing students. Soliciting evaluations from evaluators of each of the tiers 140, 150, and 160 provides an enhanced and full understanding of a teacher evaluation subject's performance.

The system 105 may use a number of criteria and/or parameters to identify/select from the set of service evaluators, including the performance tier discussed above, interactions with the evaluation subject, etc. In some examples, the identification/selection of the service evaluator(s) may be randomized. In another example, the identification/selection of the service evaluator(s) may be standardized such that the service evaluators are predetermined and/or standard for each evaluation subject. For example, a service evaluator for a teacher evaluation subject may be identified/selected as a high performing student that is a student of the evaluation subject teacher, and/or may be randomly identified/selected from a set of students in the classroom. As shown in FIG. 1, the selected service evaluators 143, 151, and 161 are selected from each tier.

As also shown in FIG. 1, the system 105 may solicit evaluations from the evaluators including the evaluations 115, 135, and 135. As shown, the evaluations 115, 135, and 145 may include both structured and audio evaluation inputs. In some examples, each of the identified/selected evaluators provides both a structured and audio input. In some examples, audio evaluations may only be requested and provided from a subgroup of the identified evaluators. For example, only the identified/selected service evaluators may be asked for an audio evaluation.

Figure 2:
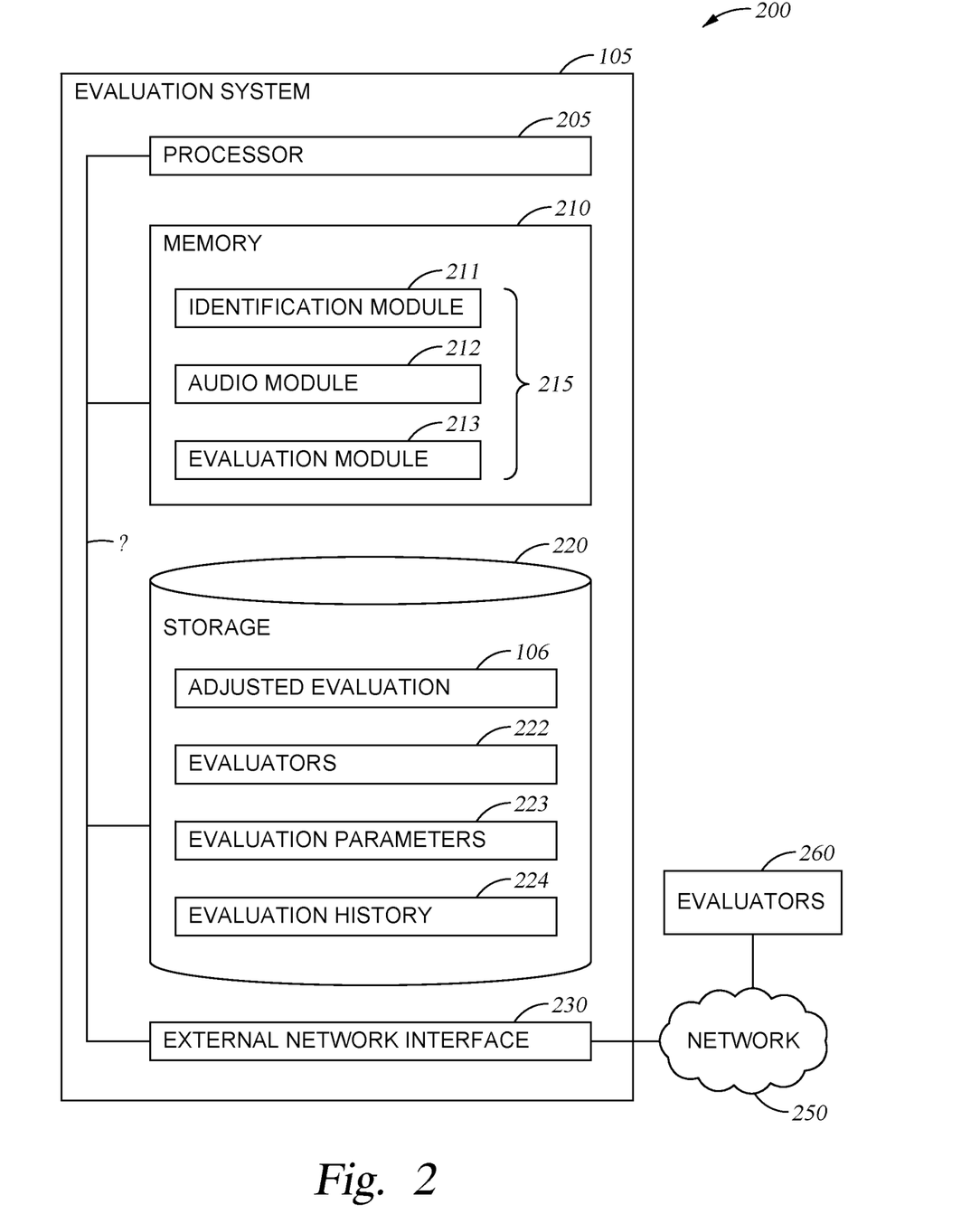
FIG. 2 is a block diagram of a system for evaluation, according to one embodiment described herein.

FIG. 2 illustrates a block diagram of a server, according to one embodiment. As shown in, the arrangement 200 may include a server embodied as evaluation system 105 and configured to perform the methods described herein. The evaluation system 105 is shown in the form of a general-purpose computing device. The components of evaluation system 105 may include, but are not limited to, one or more processors or processing units 205, a system memory 210, a storage system 220, network interface 230, and a bus 250 that couples various system components including the system memory 210 and storage system 220 to processors 205 along with the network interface 230 and various input/output components. In other embodiments, arrangement 200 is distributed and includes a plurality of discrete computing devices that are connected through wired or wireless networking.

Bus 250 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Evaluation system 105 typically includes a variety of computer system readable media. Such media may be any available media that is accessible by evaluation system 105, and it includes both volatile and non-volatile media, removable and non-removable media.

System memory 210 can include computer system readable media in the form of volatile memory, such as random access memory (RAM) and/or cache memory. Evaluation system 105 may further include other removable/non-removable, volatile/non-volatile computer system storage media. In some examples storage system 220 may be included as part of memory 210 and may typically provide a non-volatile memory for the networked computing devices, and may include one or more different storage elements such as Flash memory, a hard disk drive, a solid state drive, an optical storage device, and/or a magnetic storage device. For example, storage system 220 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 220 may include media for storing verified evaluation data 106. The storage system 220 may also include structured evaluation data 222, audio evaluation data 223, evaluation history 224, and other data related to the running of programming modules 215. The information stored in storage system 220 may be updated and accessed by the program modules 215 described herein.

Memory 210 may include a plurality of program modules 215 for performing various functions related to network performance assessment described herein. The modules 215 generally include program code that is executable by one or more of the processors 205. As shown, modules 215 include identification module 211, audio module 212, and evaluation module 213. The modules 215 may also interact with each other and storage system 420 to perform certain functions as described herein.

Figure 3:
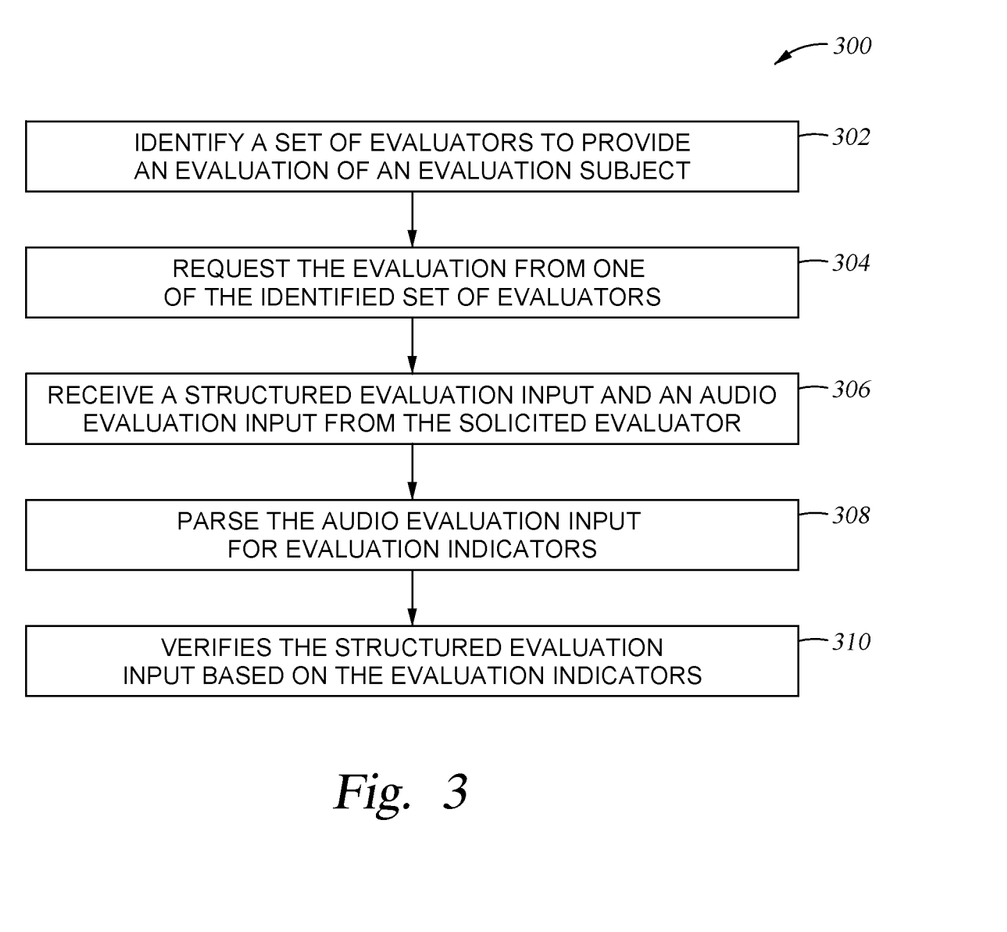
FIG. 3 is a method for evaluation, according to one embodiment described herein.

FIG. 3 is a method for evaluation, according to one embodiment. Method 300 begins at block 302 where an evaluation system, such as the evaluation system 105, including the identification module 211, identifies a set of evaluators to provide an evaluation of an evaluation subject. In some examples, the identification module 211 may receive a map/identification of evaluators including an identification of individual evaluator and/or a set of parameters to identify the set of evaluators including superior evaluators, peer evaluators, and/or service evaluators. In some examples, the service evaluators represent a range of service evaluators. For example, when the evaluation subject is a teacher, the range of service evaluators may comprise a range of high performing, average performing, and low performing students.

At block 304, the evaluation system 105, including the evaluation module 213, requests the evaluation from one of the identified set of evaluators. In some examples, the system 105 may request a structured evaluation and an audio evaluation from each of the identified set of evaluators. In some examples, the system 105 may request only a structured feedback from a subset of the set of identified set of evaluators. For example, the superior and peer evaluators may not be solicited for an audio evaluation.

At block 306, the evaluation system 105, including the evaluation module 213, receives a structured evaluation input and an audio evaluation input from the solicited evaluator. For example, the evaluation system 105 receives a structured evaluation input and an audio evaluation input from the evaluator. In some examples, the structure and audio evaluations may be collected by a user device and transmitted to the system 105 by a user device. For example, a service evaluator student may fill out a structured evaluation form and record an audio evaluation on a user device such as a mobile phone, computer, etc. In another example, the evaluators may utilize input/output components of system 105 to input the structured and audio evaluations into the system 105.

In some examples, the structured input may comprise a textual input, such as a freeform written text and/or written text in response to a structured question, a selected structured input, such as a selected drop-down menu response, and a scored input, such as a selected score in a range (e.g., score from 1-10, "poor; average; good; outstanding", etc.).

In some examples, the audio evaluation input may comprise a response to a direct question. For example, the evaluator may be prompted to provide an evaluation of the evaluation subject. In another example, the audio evaluation input may be related to a structured input. For example, the structured input for a student providing an evaluation of their teach may include a rating of the teach and the audio input may include a recorded reasoning of the rating. In some examples, the structured evaluation input may be received and/or stored by the system 105 as a single data file such as a JavaScript Object Notation (JSON) object including the evaluation along with an evaluator identification and evaluation subject identification. For example, the structured evaluation input may include:

```
structuredEvaluation.json:
    {'evaluator_id':'E001',
     'teacher_id':'T001',
     'text_rating': 'Excellent' }
```

At block 308, the evaluation system 105, including the audio module 212, parses the audio evaluation input for evaluation indicators. For example, the system 105 converts the audio evaluation input into text (e.g., using an speech-to-text application, etc.). The audio evaluation input is also parsed/processed for a tone analysis to provide evaluation indicators (e.g., using a tone analyzer, etc.). In some examples, the evaluation indicators may include voice tones such as: joy, fear, sadness, anger, analytical, confident, tentative, etc. For example, a student providing an audio evaluation may provide an audio recording reasoning for their structured evaluation of "Excellent" as "The teacher explained concepts very well!" The system 105, parses the audio recording to determine the text "The teacher explained concepts very well!" and identifies an evaluation indicator such as "Joy." The evaluation indicators may include both a tone identification and a tone count representing how many times the tone was identified in the audio recording. The system 105 may also then store the parsed audio evaluation as a JSON object as discussed in further detail in relation to FIG. 5.

At block 310, the evaluation system 105, including the audio module 212, verifies the structured evaluation input based on the evaluation indicators. In some examples, the structured evaluation input is adjusted based on the tone analysis of the audio input. In some examples, the structured evaluation is adjusted based on a tone map and/or other stored information about the evaluator. In some examples, described in relation to FIGS. 4 and 5, a stored evaluation history may be used to further verify the audio and structured evaluations. In some embodiments, a history of the evaluators tone is not needed since the tone is determined for the instant audio evaluation.

Figure 4:
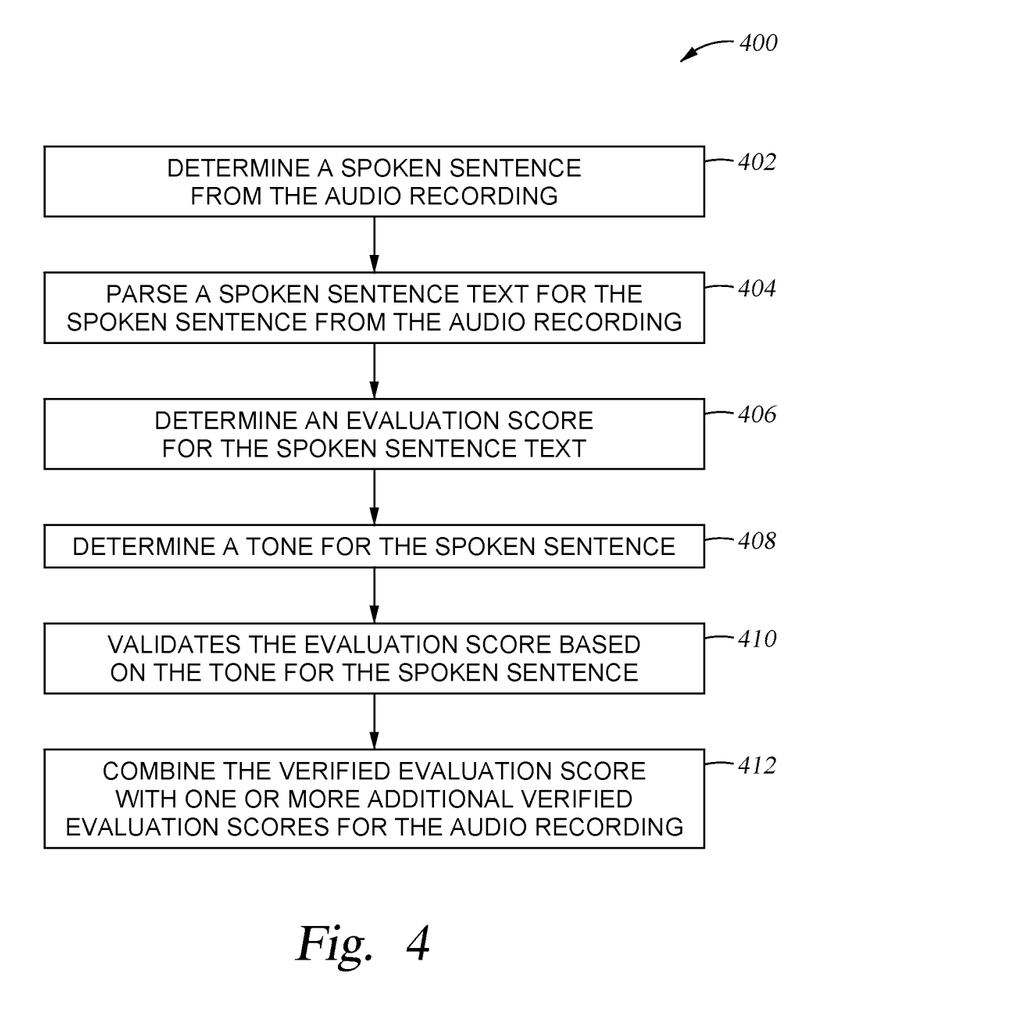
FIG. 4 is a method for parsing an audio evaluation inputs for evaluation indicators, according to one embodiment described herein.

FIG. 4 is a method for parsing the audio evaluation input for evaluation indicators, according to one embodiment. Method 400 begins at block 402 where an evaluation system, such as the evaluation system 105, including the audio module 212, determines a spoken sentence from the audio recording. For example, the audio module determines the beginning and end of each sentence and stored each sentence as a separate data object to be analyzed for varying tones.

At block 404, the evaluation system 105, including the audio module 212, parses a spoken sentence text for the spoken sentence from the audio recording. For example, the audio module 212 parses, using a speech-to-text program, words corresponding to each sentence. For example, the audio module 212 parses that student says: "The teacher explained concepts very well!" The audio module 212 then stores the parsed sentence in a data object such as a JSON object.

At block 406, the evaluation system 105, including the audio module 212 and evaluation module 213, determines an evaluation score for the spoken sentence text. For example, the evaluation module determines specific words relate a level of evaluation. For example, "very well" correlates to a positive evaluation.

At block 408, the evaluation system 105, including the audio module 212, determines a tone for the spoken sentence. For example, the audio module 212 determines the sentence: "The teacher explained concepts very well!" has a tone of "Joy." In some examples, the system 105 stores the parsed and determined components of the audio evaluation as a JSON object such as:

--- audioEvaluation.json:
    {'evaluator_id':'E001',
      'teacher_id':'T001',
      'tone_maps':{
      'The teacher explained concepts very well!': 'Joy' }
      'tone_count': { 'Joy':'1' } }

---

As shown above, the audio evaluation is stored with an identification of the evaluator, the evaluation subject, and the identified evaluation indications such as a tone map and tone count. In some examples, the system 105 stores this information for later use, such as a user profile and/or user tone map/history in evaluation history 224.

At block 410, the evaluation system 105, including the audio module 212, verifies the evaluation score based on the tone for the spoken sentence. In some examples, the verification may include determining that the determined evaluation score from the parsed text matches the determine tone for the spoken sentence. In another example, the evaluation score may be adjusted based on the tone. For example the evaluation score may be adjusted up or down based on the determined tone of the audio evaluation.

At block 412, the evaluation system 105, including the audio module 212, combines the verified evaluation score with one or more additional verified evaluation scores for the audio recording. For example, the system 105 may verify each component (sentence) of the audio evaluation and then combine the verified components for a combined evaluation score.

Figure 5:
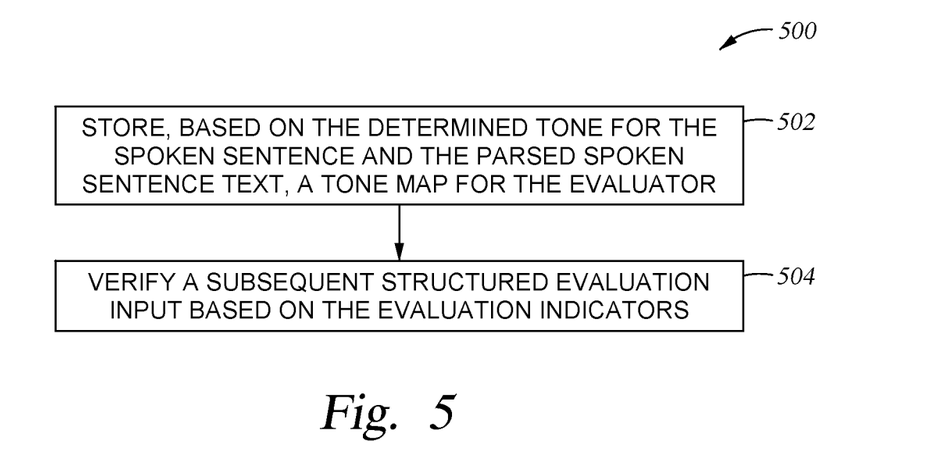
FIGS. 5-6 are additional methods for evaluation, according to embodiments described herein.

FIG. 5 is an additional method for evaluation, according to one embodiment. Method 500 begins at block 502 where an evaluation system, such as the evaluation system 105, including the audio module 212 and the evaluation module 213, stores, based on the determined tone for the spoken sentence and the parsed spoken sentence text, a tone map for the evaluator. For example, an aggregate tone count for each of the tone types identified in FIG. 4, is determined for each evaluator. In some examples, a distribution of each of the tone types is then determined for the evaluator and stored as a component of a tone history and/or tone map. For example, a past tone distribution in a user profile/tone map for an evaluator may include:

---

{'evaluator_id': 'E001',
  'past_tone_distribution': {
    'Joy':'0.9',
    'Sad':'0.1'
  } }

---

This tone distribution indicates that the evaluator predominantly expresses Joy in their evaluation speech. In some examples, No matching comparisons are required against existing tone profiles of words saved that are similar to the spoken words, since the tone profile is prepared per sentence, and the tone distribution of a evaluator related to the identification of the evaluator.

At block 504, the evaluation system 105, including the audio module 212 and the evaluation module 213, verifies a subsequent structured evaluation input based on the evaluation indicators. For example, if a tone map/tone history for an evaluator indicates that their evaluations are typically angry or negative, based on past evaluations, the system 105 verifies a subsequent structured evaluation by adjusting the evaluation in a more positive manner. For example, if the a past tone distribution indicates that the evaluator consistently has a "sad" and/or angry tone, the evaluation module 213 adjusts the structure evaluation upwards, such as moving a structured evaluation input of "average" to "above average." In another example, if the evaluator typically expresses joy in an audio evaluation, the system 105 may verify the subsequent structured evaluation by not adjusting the structured evaluation. In another example, the audio evaluation and structure evaluation may be rejected by the system 105 for the evaluator until the detected tone is "joy" and/or "polite," to prevent the evaluator from giving a falsely negative review due to outside circumstances not related to the evaluation subject's performance.

Figure 6:
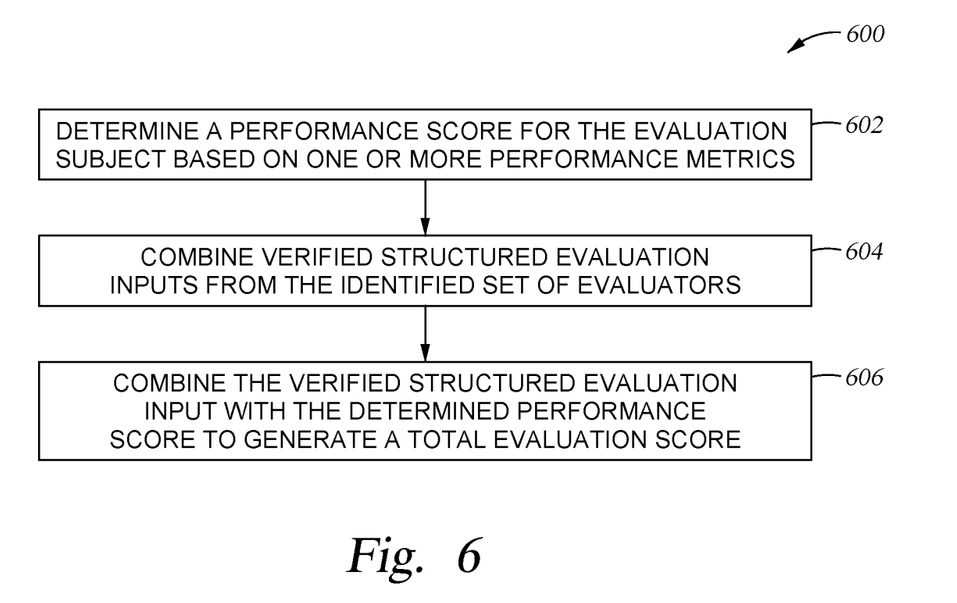

FIG. 6 is an additional method for evaluation, according to one embodiment. Method 600 begins at block 602 where an evaluation system, such as the evaluation system 105, including the evaluation module 213, determines a performance score for the evaluation subject based on one or more performance metrics. In some examples, the performance score may include the analytical performance evaluation 180, including statistical analysis of the evaluation subject service outcomes. For example, the grades and testing outcomes of the students in a teacher's class are included in the performance score.

At block 604, the system 105, including the evaluation module 213, combines the verified structured evaluation inputs from the identified set of evaluators. For example, all of the identified evaluators evaluations are verified as described herein and then combined together to create a combined score.

At block 606, the evaluation system 105, the evaluation module 213, combines the verified structured evaluation input with the determined performance score to generate a total evaluation score. For example, the system 105 combines the performance evaluation 180 with the verified structured inputs to create a total evaluation score. In some examples, the scores are weighted. For example, for a teacher, each of the superior evaluators, peer evaluators, and service evaluators may be given a different weight in the total performance score calculation. Additionally, the self-evaluation and performance evaluation may also be given a weight. For example, a teacher's total performance score may be weighted as Student evaluation 60%, Parent evaluations 5%, Peer evaluations 2%, performance score 30%, principal's evaluation 2%, and self-evaluation 1%, among other examples. This weighting allows for the total performance score to be closely related to the instruction the teacher is providing to students and to the students' performance outcomes.

In some examples, the total performance score can be calculated on an ongoing basis. For example, a teacher may be evaluated based on every class, subject, grade, etc. in which the teacher instructs students. For example, at the end of a given subject, a teacher may be evaluated on the outcome of the subject. In another example, a teacher may be evaluated at the end of a semester or school year. The ongoing evaluation allows for teachers and principals to identify areas where the teacher needs improvement and/or deserves recognition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., evaluation module 213 and audio module 212) or related data available in the cloud. For example, the modules 215 could execute on a computing system in the cloud and receive and verify evaluation inputs from identified evaluators. In such a case, the modules 215 could also access and store various information related to structured evaluation inputs, audio evaluation inputs, and stored evaluation histories at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for evaluation comprising:
  identifying a set of evaluators, from a pool of potential evaluators, to provide an evaluation of an evaluation subject, wherein the set of evaluators comprises at least one peer evaluator, at least one superior evaluator, and at least one service evaluator, wherein the at least one service evaluator received service from the evaluation subject, wherein the at least one superior evaluator and the at least one peer evaluator observed service provided by the evaluation subject, and wherein each evaluator in the identified set of evaluators provides an evaluation;
  requesting the evaluation from one of the identified set of evaluators;

receiving a structured evaluation input and an audio evaluation input from the solicited evaluator;

parsing the audio evaluation input for evaluation indicators;

determining an evaluation score for at least one portion of parsed text from the parsed audio evaluation input;

determining a tone for the at least one portion of the audio evaluation input corresponding to the at least one portion of parsed text;

verifying the evaluation score based on the tone for at least one portion of parsed text by at least determining an evaluation level of the evaluation score matches the determined tone; and verifying the structured evaluation input based on the evaluation indicators by at least adjusting the structured evaluation input based on a combined evaluation score comprising at least the verified evaluation score.

2. The method of claim 1, wherein identifying the set of evaluators to provide an evaluation of an evaluation subject comprises:

identifying one or more peer evaluators;
identifying one or more superior evaluators; and
identifying one or more service evaluators, wherein the identified one or more service evaluators represent a range of service evaluators.

3. The method of claim 1, wherein the structured evaluation inputs comprise one or more of:

a textual input;
a selected structured input; and
a scored input.

4. The method of claim 1, wherein the audio evaluation input comprises an audio recording of an evaluation from the evaluator, and wherein parsing the audio evaluation input for the evaluation indicators comprises:

determining a spoken sentence from the audio recording;
parsing a spoken sentence text for the spoken sentence from the audio recording;
determining an evaluation score for the spoken sentence text;
determining a tone for the spoken sentence;
verifying the evaluation score based on the tone for the spoken sentence; and
combining the verified evaluation score with one or more additional verified evaluation scores for the audio recording.

5. The method of claim 4, wherein verifying the structured evaluation input based on the evaluation indicators comprises:

verifying the structured evaluation input using the combined verified evaluation score for the audio recording.

6. The method of claim 4, further comprising:

storing, based on the determined tone for the spoken sentence and the parsed spoken sentence text, a tone map for the evaluator; and
verifying a subsequent structured evaluation input based on the evaluation indicators.

7. The method of claim 1, further comprising:

determining a performance score for the evaluation subject based on one or more performance metrics;
combining verified structured evaluation inputs from the identified set of evaluators; and
combining the verified structured evaluation input with the determined performance score to generate a total evaluation score.

8. A system for evaluation comprising:

one or more computer processors; and
a memory containing a program which when executed by the processors performs an operation comprising:

identifying a set of evaluators, from a pool of potential evaluators, to provide an evaluation of an evaluation subject, wherein the set of evaluators comprises at least one peer evaluator, at least one superior evaluator, and at least one service evaluator, wherein the at least one service evaluator received service from the evaluation subject, wherein the at least one superior evaluator and the at least one peer evaluator observed service provided by the evaluation subject, and wherein each evaluator in the identified set of evaluators provides an evaluation;

requesting the evaluation from one of the identified set of evaluators;

receiving a structured evaluation input and an audio evaluation input from the solicited evaluator;

parsing the audio evaluation input for evaluation indicators;

determining an evaluation score for at least one portion of parsed text from the parsed audio evaluation input;

determining a tone for the at least one portion of the audio evaluation input corresponding to the at least one portion of parsed text;

verifying the evaluation score based on the tone for at least one portion of parsed text by at least determining an evaluation level of the evaluation score matches the determined tone; and verifying the structured evaluation input based on the evaluation indicators by at least adjusting the structured evaluation input based on a combined evaluation score comprising at least the verified evaluation score.

9. The system of claim 8, wherein identifying the set of evaluators to provide an evaluation of an evaluation subject comprises:

identifying one or more peer evaluators;
identifying one or more superior evaluators; and
identifying one or more service evaluators, wherein the identified one or more service evaluators represent a range of service evaluators.

10. The system of claim 8, wherein the structured evaluation inputs comprise one or more of:

a textual input;
a selected structured input; and
a scored input.

11. The system of claim 8, wherein the audio evaluation input comprises an audio recording of an evaluation from the evaluator, and wherein parsing the audio evaluation input for the evaluation indicators comprises:

determining a spoken sentence from the audio recording;
parsing a spoken sentence text for the spoken sentence from the audio recording;
determining an evaluation score for the spoken sentence text;
determining a tone for the spoken sentence;
verifying the evaluation score based on the tone for the spoken sentence; and
combining the verified evaluation score with one or more additional verified evaluation scores for the audio recording.

12. The system of claim 11, wherein verifying the structured evaluation input based on the evaluation indicators comprises:

verifying the structured evaluation input using the combined verified evaluation score for the audio recording.

13. The system of claim 11, wherein the operation further comprises:

storing, based on the determined tone for the spoken sentence and the parsed spoken sentence text, a tone map for the evaluator; and verifying a subsequent structured evaluation input based on the evaluation indicators.

14. The system of claim 8, wherein the operation further comprises:

determining a performance score for the evaluation subject based on one or more performance metrics;

combining verified structured evaluation inputs from the identified set of evaluators; and combining the verified structured evaluation input with the determined performance score to generate a total evaluation score.

15. A computer program product for evaluation, the computer program product comprising:

a computer-readable storage medium having computer-readable program code embodied therewith, the computer-readable program code executable by one or more computer processors to perform an operation, the operation comprising:

identifying a set of evaluators, from a pool of potential evaluators, to provide an evaluation of an evaluation subject, wherein the set of evaluators comprises at least one peer evaluator, at least one superior evaluator, and at least one service evaluator, wherein the at least one service evaluator received service from the evaluation subject, wherein the at least one superior evaluator and the at least one peer evaluator observed service provided by the evaluation subject, and wherein each evaluator in the identified set of evaluators provides an evaluation;

requesting the evaluation from one of the identified set of evaluators;

receiving a structured evaluation input and an audio evaluation input from the solicited evaluator;

parsing the audio evaluation input for evaluation indicators;

determining an evaluation score for at least one portion of parsed text from the parsed audio evaluation input;

determining a tone for the at least one portion of the audio evaluation input corresponding to the at least one portion of parsed text;

verifying the evaluation score based on the tone for at least one portion of parsed text by at least determining an evaluation level of the evaluation score matches the determined tone; and verifying the structured evaluation input based on the evaluation indicators by at least adjusting the structured evaluation input based on a combined evaluation score comprising at least the verified evaluation score.

16. The computer program product of claim 15, wherein identifying the set of evaluators to provide an evaluation of an evaluation subject comprises:

identifying one or more peer evaluators;

identifying one or more superior evaluators; and identifying one or more service evaluators, wherein the identified one or more service evaluators represent a range of service evaluators.

17. The computer program product of claim 15, wherein the audio evaluation input comprises an audio recording of an evaluation from the evaluator, and wherein parsing the audio evaluation input for the evaluation indicators comprises:

determining a spoken sentence from the audio recording;

parsing a spoken sentence text for the spoken sentence from the audio recording;

determining an evaluation score for the spoken sentence text;

determining a tone for the spoken sentence;

verifying the evaluation score based on the tone for the spoken sentence; and combining the verified evaluation score with one or more additional verified evaluation scores for the audio recording.

18. The computer program product of claim 17, wherein verifying the structured evaluation input based on the evaluation indicators comprises:

verifying the structured evaluation input using the combined verified evaluation score for the audio recording.

19. The computer program product of claim 17, wherein the operation further comprises:

storing, based on the determined tone for the spoken sentence and the parsed spoken sentence text, a tone map for the evaluator; and verifying a subsequent structured evaluation input based on the evaluation indicators.

20. The computer program product of claim 15, wherein the operation further comprises:

determining a performance score for the evaluation subject based on one or more performance metrics;

combining verified structured evaluation inputs from the identified set of evaluators; and combining the verified structured evaluation input with the determined performance score to generate a total evaluation score.

* * * * *